US012464208B2

(12) United States Patent
Lundberg et al.

(10) Patent No.: US 12,464,208 B2
(45) Date of Patent: Nov. 4, 2025

(54) METHOD FOR CONTROLLING INFRARED ILLUMINATION SOURCE (71) Applicant: Axis AB, Lund (SE)

(72) Inventors: Stefan Lundberg, Lund (SE); Kajsa Larsson, Lund (SE); Kent Fransson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/884,873

(22) Filed: Sep. 13, 2024

(65) Prior Publication Data
US 2025/0168475 A1 May 22, 2025

(30) Foreign Application Priority Data
Nov. 16, 2023 (EP) .................... 23210256

(51) Int. Cl.
*H04N 23/74* (2023.01)
*H04N 23/20* (2023.01)
*H04N 23/71* (2023.01)

(52) U.S. Cl.
CPC ............ *H04N 23/20* (2023.01); *H04N 23/71* (2023.01); *H04N 23/74* (2023.01)

(58) Field of Classification Search
CPC ............................ H04N 23/56; H04N 23/71
See application file for complete search history.

(56) References Cited

U.S. PATENT DOCUMENTS 11,611,812 B2 * 3/2023 Jönsson ............... H04N 23/20
2006/0132859 A1 6/2006 Kalapathy et al.
(Continued)

FOREIGN PATENT DOCUMENTS

CN 102044152 B 10/2013
EP 3886539 A1 9/2021
(Continued)

OTHER PUBLICATIONS

Guri, M., et al., "aIR-Jumper: Covert Air-Gap Exfiltration/Infiltration via Security Cameras & Infrared (IR)," Article, Shamoon College of Engineering, Israel, (2017).
(Continued)

*Primary Examiner* — Jayanti K Patel
*Assistant Examiner* — Christopher Kingsbury Glover
(74) *Attorney, Agent, or Firm* — Volpe Koenig (57) ABSTRACT A method and a video capturing system for controlling at least one infrared (IR) illumination source, illuminating an area captured by a camera, the method comprising modulating emission from the IR illumination source between first and second emission intensities at a first frequency during a first predetermined time period. Upon capturing images using an image sensor of the camera during the first predetermined time period, determining a radiation level indicator for each of a plurality of images captured by the image sensor. Further, evaluating a sequence of determined radiation level indicators to determine whether a frequency resulting from the modulated emission at the first frequency is detected in the sequence of radiation level indicators. If the frequency resulting from the modulated emission at the first frequency is determined as not detected in the sequence of radiation level indicators, the IR illumination source is stopped.

15 Claims, 5 Drawing Sheets

(56) References Cited

U.S. PATENT DOCUMENTS

| | | | |
|---|---|---|---|
| 2019/0246025 A1* | 8/2019 | Duran | H04N 23/20 |
| 2022/0283442 A1 | 9/2022 | Lee et al. | |
| 2022/0299642 A1* | 9/2022 | Bray | G01H 9/00 |
| 2023/0128534 A1* | 4/2023 | Linseis | G01N 25/18 374/43 |

FOREIGN PATENT DOCUMENTS

| | | |
|---|---|---|
| EP | 4224837 B1 | 6/2024 |
| TW | 202143696 A | 11/2021 |

OTHER PUBLICATIONS

Extended European Search Report dated Apr. 15, 2024 for European Patent Application No. 23210256.6.

\* cited by examiner

METHOD FOR CONTROLLING INFRARED ILLUMINATION SOURCE

FIELD OF INVENTION

The present disclosure relates to control of infrared light emitting diodes and in particular control of infrared light emitting diodes used to light an area captured by a camera.

TECHNICAL BACKGROUND

Cameras for capturing moving pictures, i.e., video, are often used for monitoring and/or surveillance of areas of interest. These areas of interest may be exposed for varying lighting conditions over time and in particular over 24 hours when the scene to be captured will be in daylight during some portion of the 24-hour span and in low to no light during another portion of the 24-hour span, i.e., nighttime. To enable cameras to capture relevant video during the day as well as during the night many cameras of today are provided with at least two different capturing modes, a day mode and a night mode.

The image sensors of cameras are sensitive to light in the infrared spectrum, at least in the near infrared spectrum, and in order to reproduce colours in the captured images as seen by the human eye, the infrared light is stopped from reaching the image sensor by an infrared-cut filter positioned in the optical path between the lens and the image sensor. However, in low-light conditions, e.g., at night, all light that is detectable by the image sensor contribute to the image quality and therefore the infrared-cut filter is removed from the optical path to allow the infrared light to be detected by the image sensor. By utilising the light in this low frequency spectrum, the usefulness of the camera is extended to low-light environments as well. The low-light imagery from the camera may be enhanced by lighting the captured scene by using infrared light emitting diodes. Lighting the scene using such infrared light emitting diodes will increase the camera's ability to use infrared light and/or near-infrared light to deliver quality images. Infrared light and/or near infrared light from such illumination is not visible to the human eye, but the image sensor without the infrared-cut filter will detect it.

However, the light emitting diodes should be active only when needed, e.g., when the area that is captured by the camera is experiencing low-light, and the infrared-cut filter should be removed from the optical path in low-light situations and reinserted in the optical path when the lighting conditions are improved. The activation and deactivation of the light emitting diodes and the removal and reinsertion of the infrared-cut filter depends on if there is enough light in the scene or not.

In EP 3 886 539 A1 (Axis AB), 29 Sep. 2021, a method for assessing an ambient light level during video acquisition with a video camera in order to control the positioning of an infrared-cut filter for filtering out infrared light or not is described. The method includes capturing a stream of images when the scene is illuminated by an IR illuminator having a first output level and then capturing a stream of images when the scene is illuminated by the IR illuminator having a reduced output level. These two streams of images are then evaluated for a measure representative of an ambient light level. Although the method provides an excellent method for determining when to switch between night mode and day mode in a camera there are situations and implementations where it may be difficult to properly assess these streams due to, e.g., the level of a noise component in the detected signals or because the reduced level will not be allowed to be reduced enough for triggering a detection.

From the above it is understood that there is room for solutions further facilitating the determination for switching of additional illumination using an IR illuminator when not needed any more and/or to remove an infrared-cut filter from the optical path.

SUMMARY

The disclosure is defined by the appended independent claims. Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

In a first aspect a method for controlling at least one infrared illumination source, IR illumination source, illuminating an area captured by a camera, comprises modulating emission from the IR illumination source between a first emission intensity and a second emission intensity at a first frequency during a first predetermined time period, capturing images using an image sensor of the camera during the first predetermined time period, determining a radiation level indicator for each one of a plurality of the images captured by the image sensor, evaluating a sequence of determined radiation level indicators to determine whether a frequency resulting from the modulated emission at the first frequency is detected or not in the sequence of radiation level indicators, if the evaluation results in the frequency resulting from the modulated emission at the first frequency being determined as not detected in the sequence of radiation level indicators, the IR illumination source is stopped from lighting the area captured by the camera. One advantage of the method is that it is a simple, robust and effective way of controlling the IR illumination source illuminating a scene to be captured by a camera. Another advantage is that the method may allow the IR illumination source to be turned off when there is no need for the illumination anymore, thereby enabling energy savings.

In some embodiments the evaluating of the sequence of radiation level indicators includes applying a transform to the sequence of radiation level indicators transforming the sequence of radiation level indicators to a frequency domain. The use of a frequency transform facilitates the evaluation of the received radiation and is simple to implement and operate.

In yet some embodiments the determining of detection or no detection of the frequency resulting from the modulated emission at the first frequency in the sequence of radiation level indicators includes determining no detection of the frequency resulting from the modulated emission at the first frequency if the transformed sequence of radiation level indicators results in a value at the frequency resulting from the modulated emission at the first frequency that is less than a threshold value.

In some embodiments the second emission intensity is 50-95 percent of the first emission intensity of the IR illumination source and in some embodiments the first predetermined time period during which the IR illumination source is modulated is a second to 10 minutes.

In yet some embodiments the determining of the radiation level indicator of a captured image includes determining an upper quartile luminance value of an area of the captured image. One advantage of this feature is that the detection of the introduced variation in lighting may be facilitated as the focus of the detection is shifted towards variation at a higher detected radiation intensity.

In some embodiments the method also comprises generating a signal instructing the camera to insert an IR-filter in an optical path leading to an image sensor of the camera if the evaluation results in the frequency resulting from the modulated emission at the first frequency being determined as not detected in the sequence of radiation level indicators.

In some additional embodiments the method comprises operating the IR illumination source in a normal mode for a delay time period, if the evaluation results in the frequency resulting from the modulated emission at the first frequency being determined as detected in the sequence of radiation level indicators, the normal mode being that the IR illumination source is operated as it was operated before the first time period during which the IR illumination source was modulated, before the test process is started again. One advantage of this procedure is that the method will detect the switch from bad environmental lighting conditions to acceptable environmental lighting conditions without continuously modulating the emission from the IR illumination source.

In yet some embodiments the control method includes at least a two-step process in which the process where the IR illumination source is stopped from lighting the area captured by the camera relates to a final step and wherein an initial step includes modulating emission from the IR illumination source between a first initial emission intensity and a second initial emission intensity at a second frequency during a second predetermined time period, capturing images using the camera during the second predetermined time period, determining a radiation level indicator of each one of a plurality of the captured images, creating an initial sequence of radiation level indicators including determined radiation level indicators from the plurality of the captured images, evaluating the initial sequence of radiation level indicators to determine whether a frequency resulting from the modulated emission at the second frequency is detected or not in the initial sequence of radiation level indicators, if the evaluation results in the frequency resulting from the modulated emission at the second frequency being determined as not detected in the sequence of radiation level indicators, a next step in the at least two-step process is initiated. One advantage of this scheme is that the modulated emissions from the IR illumination source may be less intrusive and/or disturbing for a user watching the actual scene or the scene captured by the camera. One reason for this is that the variation may be kept at a low amplitude or variation level in lighting conditions where the variation may be very pronounced, e.g. in darker environmental lighting conditions.

In some embodiments the first frequency and the second frequency are the same frequency and in yet some embodiments the control method is a two-step process and the next step in the at least two-step process is the final step.

Some embodiments may include evaluating captured images from the camera for motion in the area captured by the camera and initiating the modulation of the emission from the IR illumination source when the motion evaluation indicates a motion value that is lower than a motion threshold. One advantage of this is that the risk of moving objects in the scene effecting the correct detection of variation in the scene is decreased. Another advantage may be that a risk of the modulation of the IR affecting the motion detection is decreased.

In some embodiments the evaluating of the sequence of determined radiation level indicators to determine whether the frequency resulting from the modulated emission at the first frequency is detected or not in the sequence of radiation level indicators further include determining if the first frequency or if a frequency resulting from aliasing of the first frequency and a frame rate of the captured images is detected or not in the sequence of radiation level indicators.

According to a second aspect the method is carried out in a video capturing system configured for this purpose. The advantages described in relation to the method is appliable to corresponding features of the video capturing system.

According to a third aspect a computer-readable medium comprising instructions which, when executed by a computer, cause the computer to carry out the method. Accordingly, the method may be implemented as computer executable code which may be made available in various ways. The advantages described in relation to the method is appliable to corresponding features of the computer-readable medium.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description. Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the disclosure and are not therefore to be considered to be limiting in scope, the examples will be described and explained with additional specificity and detail through the use of the accompanying drawings in which.

Further, in the figures like reference characters designate like or corresponding parts throughout the several figures.

DETAILED DESCRIPTION

Hereinafter, certain embodiments will be described more fully with reference to the accompanying drawings. It will be apparent to those skilled in the art that various modifications and variations can be made without departing from the inventive concept. Other embodiments will be apparent to those skilled in the art from consideration of the specification and practice disclosed herein. The embodiments herein are provided by way of example so that this disclosure will be thorough and complete, and will fully convey the scope of the inventive concept, and that the claims be construed as encompassing all equivalents of the present inventive concept which are apparent to those skilled in the art to which the inventive concept pertains. If nothing else is stated, different embodiments may be combined with each other.

The present disclosure relates to a method, an apparatus, and a system for controlling at least one infrared illumination source, hereinafter also referred to as IR illumination source. An IR illumination source may be an infrared light emitting diode, hereinafter referred to IR LED, or a device including a plurality of IR LEDs, arranged to emit IR light or near IR light onto an area which is of interest to capture images of. The IR illumination source may be or include other sources of infrared light than IR LEDs, for example IR Laser diodes or other IR sources. However, to facilitate the understanding of the following description the term IR LED may be used as a representation for both IR LEDs and such other emitters of infrared light throughout the description.

Figure 1:
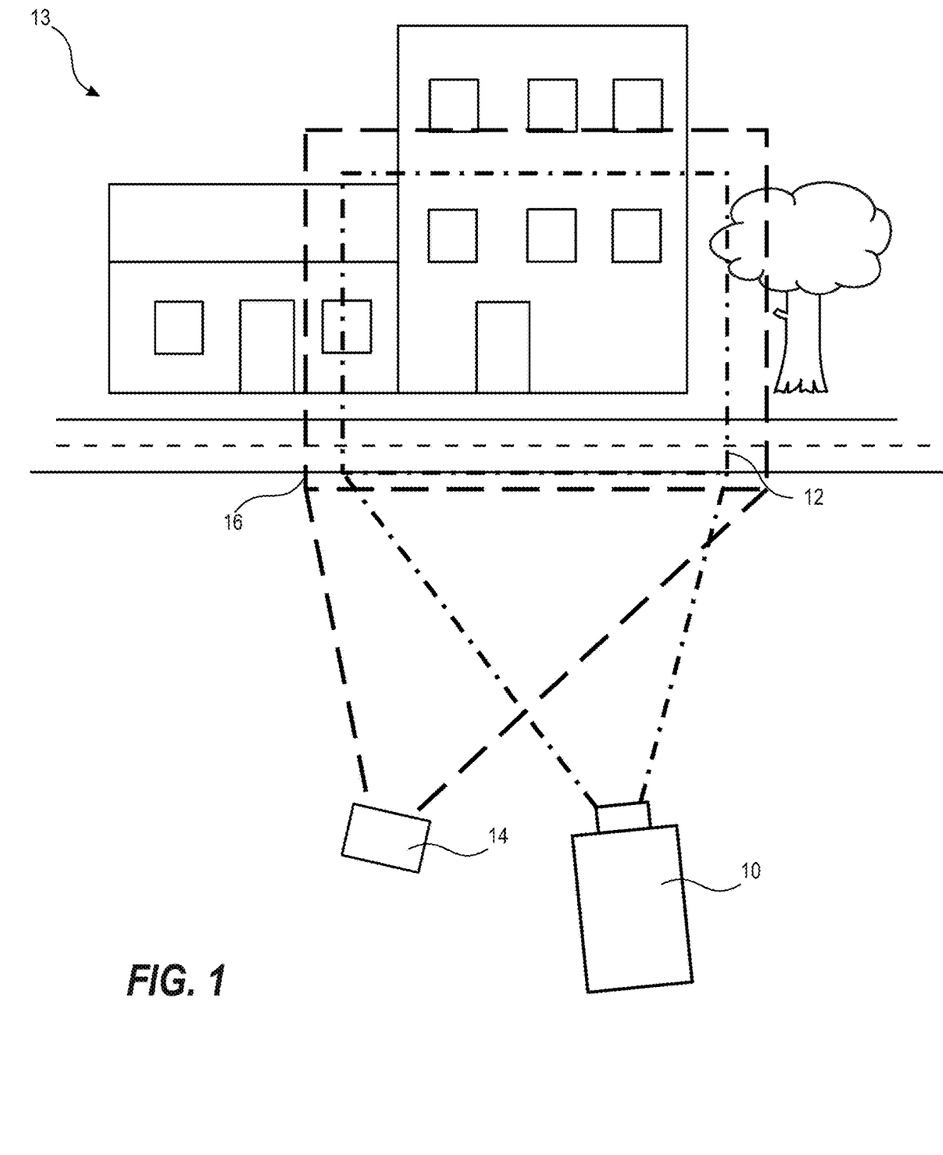
FIG. 1 is depicting a schematic view of a video capturing system, implementing embodiments of the disclosure, in a possible environment.

Now referring to FIG. 1, an example of a setup including the disclosure and/or devices implementing the disclosure is depicted. A camera 10 is arranged to capture images of an area 12 in a scene 13, represented by the square 12 drawn in FIG. 1 using a dashed line with dots. In this description a scene 13 should be interpreted as a view of the surroundings as seen from the position of the camera. An IR illumination source 14 is arranged to emit IR light towards the scene 13 in order to "illuminate" the area captured by the camera 10 for enhanced image capturing during low-light conditions. The area 16 receiving radiation from the IR illumination source is in some cases larger than the area 12 captured by the camera 10 and in some cases smaller than the area 12 of the scene captured by the camera. The illuminated area may include the entire scene 13, part of the scene 13, the area 12 of the scene 13 captured by the camera 10, or a part of the area 12 of the scene 13 captured by the camera. The area 16 receiving the IR radiation, according to some embodiments, is represented by the square 16 drawn in FIG. 1 as a dashed line. In the example setup of FIG. 1 the camera 10 and the IR illumination source 14 are depicted as separate devices, however, the IR illumination source 14 may in some embodiments be included in the housing of the camera 10 radiating IR light in the same direction as the camera is pointed.

The camera 10 may be a camera capturing sequences of moving pictures or a continuous stream of moving pictures, i.e. capturing video sequences or continuous video streams. The camera 10 may be a video camera 10 connected to a network of digital video cameras and/or a video camera 10 connected to a computer network, e.g., a LAN, a WAN, the Internet, etc., or a video camera 10 that is not networked at all but includes local storage for storing the footage and/or video captured by the camera 10.

Figure 2:
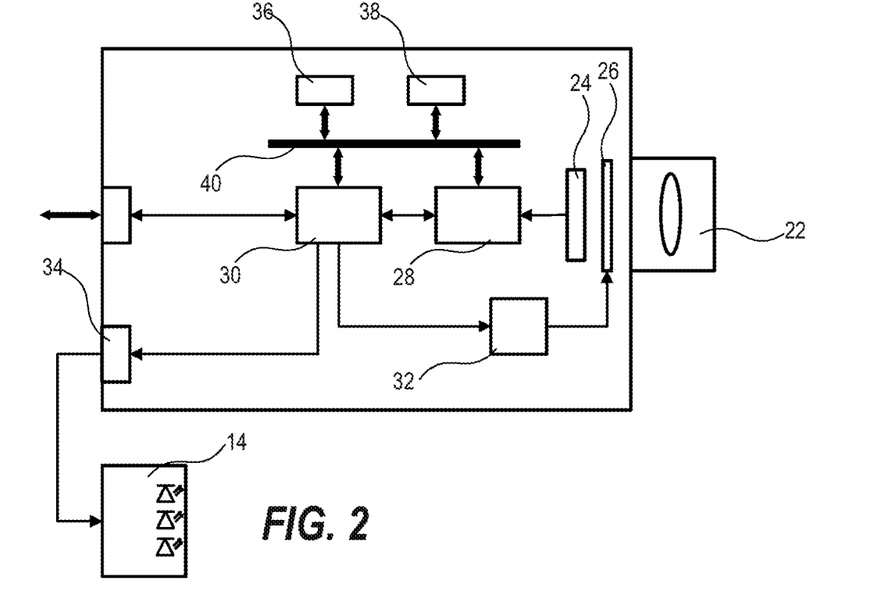
FIG. 2 is a schematic block diagram of a camera and an IR illumination source according to some embodiments of the disclosure.

In some embodiments the camera 10 is a digital video camera 10 as shown in FIG. 2. The camera includes a lens 22 focusing an image via the optical path of the camera onto an image sensor 24. The camera 10 also includes an infrared-cut filter 26 which is moveable from a position in the optical path in front of the image sensor 24 to a position where it is not interfering with the light guided via the optical path to the image sensor 24, i.e., from a position in front of the image sensor 24 to a position not in front of the image sensor 24. The infrared-cut filter 26 is also arranged to be moved in the opposite direction, i.e. back from the position where it is not interfering with the light guided via the optical path to the image sensor 24 to the position in the optical path in front of the image sensor 24.

The camera 10 may also include an image processor 28 connected to the image sensor 24 to process the image data generated by the image sensor 24. The image processor 28 may alternatively be arranged in a device, not shown, separate from the camera 10 and connected to the camera via a network or direct communication lines. The image processor 28 is connected to a Central Processing Unit, CPU 30, which in some embodiments runs software code controlling the positioning of the infrared-cut filter 26 and software code controlling the IR illumination source 14. In some embodiments the CPU 30 communicates control instructions/signals to an actuator 32 physically connected to the infrared-cut filter 26 to control the positioning of the infrared-cut filter 26. In some embodiments the CPU 30 communicates control instructions/signals to an interface 34 for controlling the IR illumination source 14, being a device external to the camera. Further, the camera 10 includes a non-volatile memory 36 and a volatile memory 38, both connected to the CPU 30 and the image processor 28 via a data bus 40. The non-volatile memory 36 may store program code for controlling the camera 10 and the operations related to the camera 10, e.g., controlling the IR illumination source 14. The control of the IR illumination source may for instance include precision control of the emission intensity and/or switching on and off the IR illumination source. The control of the IR illumination source may also be synchronised with the exposure intervals of the image sensor. The non-volatile memory 36 may for instance be Read Only Memory (ROM), PROM, EPROM, EEPROM, Mask ROM, Flash memory, Ferroelectric RAM, Magneto resistive RAM, Phase-change RAM, FeFET memory, RRAM memory, etc. The volatile memory 38 may operate as a working memory for processors 28, 30 of the camera 10 and may for instance be Random Access Memory (RAM), SRAM, DRAM. Further, the camera may include a network interface 42 for connecting the camera 10 to the computer network as discussed above.

Figure 3:
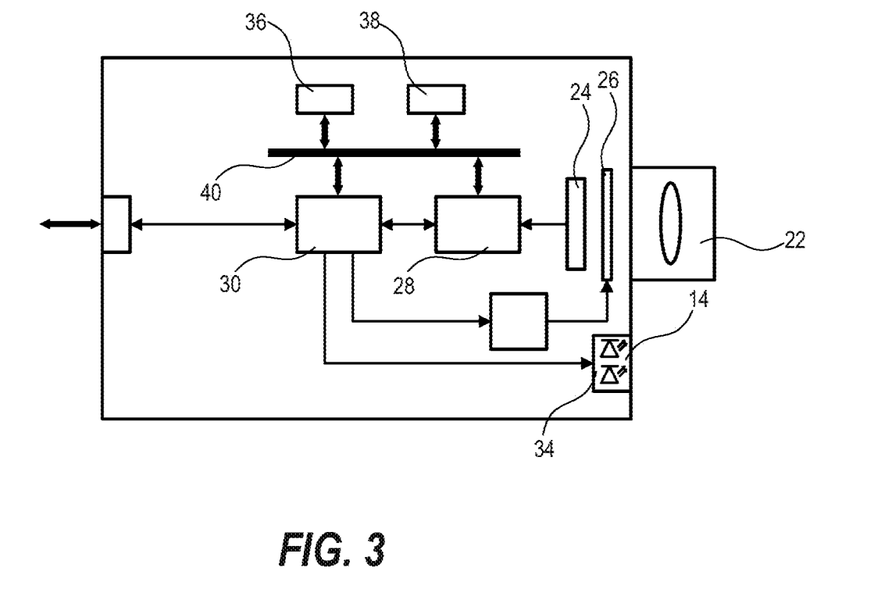
FIG. 3 is a schematic block diagram of a camera and an IR illumination source according to some embodiments of the disclosure.

In FIG. 3 a camera according to alternative embodiments is shown. One difference between the camera 10 in FIG. 3 compared to the camera of FIG. 2 is that the IR illumination source 14 is included as a part of the camera. Resulting from the short distance between the IR illumination source and the lens the IR illumination source is arranged to emit IR in a direction coinciding with the direction in which the lens of the camera 10 captures images in order to have the IR radiation illuminate the area captured by the camera 12.

When the infrared-cut filter 26 is in the position where it is out of the optical path, i.e. not filtering out infrared light before the light/radiation reach the image sensor 24, the image sensor 24 will detect both visible light and infrared light, at least near infrared light, near infrared light is generally considered to refer to wavelengths from 800-2500 nm. The human eye is generally considered sensitive to light in the wavelength range of 380-800 nm. However, a normal image sensor 24 of today, without an infrared-cut filter, may be able to detect wave lengths up to 1100 nm. Accordingly, an image sensor 24 without any filter removing the infrared radiation detects electromagnetic waves having a wavelength longer than 800 nm.

A radiation level indicator, e.g., a value indicating the radiation received at the camera and/or the sensor, may be determined in the camera, either by the image processor 28 or by the CPU 30. The radiation level indicator being a value registered by the image sensor indicating the level of radiation, i.e. visible light and infrared light, that is reflected from the scene 12 onto the image sensor 24. In some embodiments this value is calculated from all pixels of the image sensor 24 or from a limited area of pixels on the image sensor 24. Such calculation may include calculating, for a captured image frame or the limited area of pixels, the average intensity received in the pixels, the median intensity received in the pixels, an upper quantile intensity received in the pixels, e.g., an upper quartile, the sum of the pixel values, etc. The pixels used for the calculation may be pixels representing all three colour channels, i.e., Red, Green and Blue, a combination of two colour channels, or only one of the channels, e.g. the Red channel. In some embodiments the value representing the radiation level indicator may include a value already generated for other purposes by the camera, such as exposure value, gain, exposure time, etc. In some cameras a value for the luminance of the radiation captured by the camera is automatically generated by the camera. Using values already generated by the camera is advantageous as there is no need to use extra processing power to achieve these values and the processing speed for the camera is not decreased due to separate processing to acquire data required for the function. The gain, referred to above, is a value indicating an amplification of the signal from the camera sensor and is automatically set in the camera in relation to the luminance captured by the image sensor. The term luminance in relation to the acquiring of the radiation level indicator is intended to represent radiation registered by the image sensor, i.e., visible light and at least some frequencies of IR-light.

In cameras, camera systems, or camera installations utilising an IR illumination source and/or the activity of removing an infrared-cut 26 filter from the optical path of the camera 10 for increasing the image quality of images captured in low-light or no light conditions, the detection of changing lighting conditions may be important for reasons of energy savings and image quality. Energy wasted on unnecessary lighting is avoided by switching off the extra illumination from the IR illumination source when not needed and the image quality, in particular the colour quality, is increased by inserting the infrared-cut filter in the optical path in appropriate lighting conditions. Hence, information is acquired indicating if the lighting conditions in the area that is captured by the camera is enough for having the camera 10 or system operate in day mode or if the lighting conditions is inferior to such degree that the camera has to operate in night mode. The night mode of the camera 10 or system includes activated IR illumination source for 14 illumination of the area 12 captured by the camera 10 and/or removal of the infrared-cut filter 26 from the optical path of the camera 10. The day mode of the camera 10 or system includes non-active IR illumination source for illumination of the area captured by the camera and/or insertion of the infrared-cut filter 26 in the optical path of the camera 10, i.e., no additional radiation from the IR illumination source 14 and the radiation reaching the image sensor being filtered by the infrared-cut filter 26.

To have the camera or system operate in day mode means that the camera is set up to operate during so called normal lighting conditions. For instance the camera in day mode will have an infrared-cut filter 26 arranged in the optical path in front of the image sensor. When the lighting conditions deteriorate, i.e., getting darker, it will at some point be difficult or even impossible to capture images of acceptable quality by simply adjusting normal camera settings, the camera will be set to operate in the night mode. In the night mode particular settings are used in order to enable capturing of usable images. Such settings may be removing the infrared-cut filter 26 from the optical path in order to allow the image sensor of the camera to capture an extended wavelength range of electromagnetic radiation, e.g., infrared or near infrared in addition to visible light and/or providing additional lighting of the scene.

Detecting when to switch from night mode to day mode may be achieved by detecting the light coming from the environment without registering the light from the IR illumination source 14. This may easily be done by the use of a separate light meter screened from the light of the IR illumination source 14. However, such a solution requires, as mentioned, a separate light meter and, moreover, in order to represent the lighting condition in the scene 12 it should be positioned at the scene 12. This becomes especially difficult and expensive if the camera 10 capturing the scene 12 is far from the scene 12, e.g. a camera 10 having a telephoto lens.

The inventors have therefore come up with an alternative way of detecting the transition from a low-light situation with the scene 12 illuminated by the IR illumination source 14 to a lighting situation where the illumination from the IR illumination source 14 is no longer needed and to control the IR illumination source accordingly.

Figure 4:
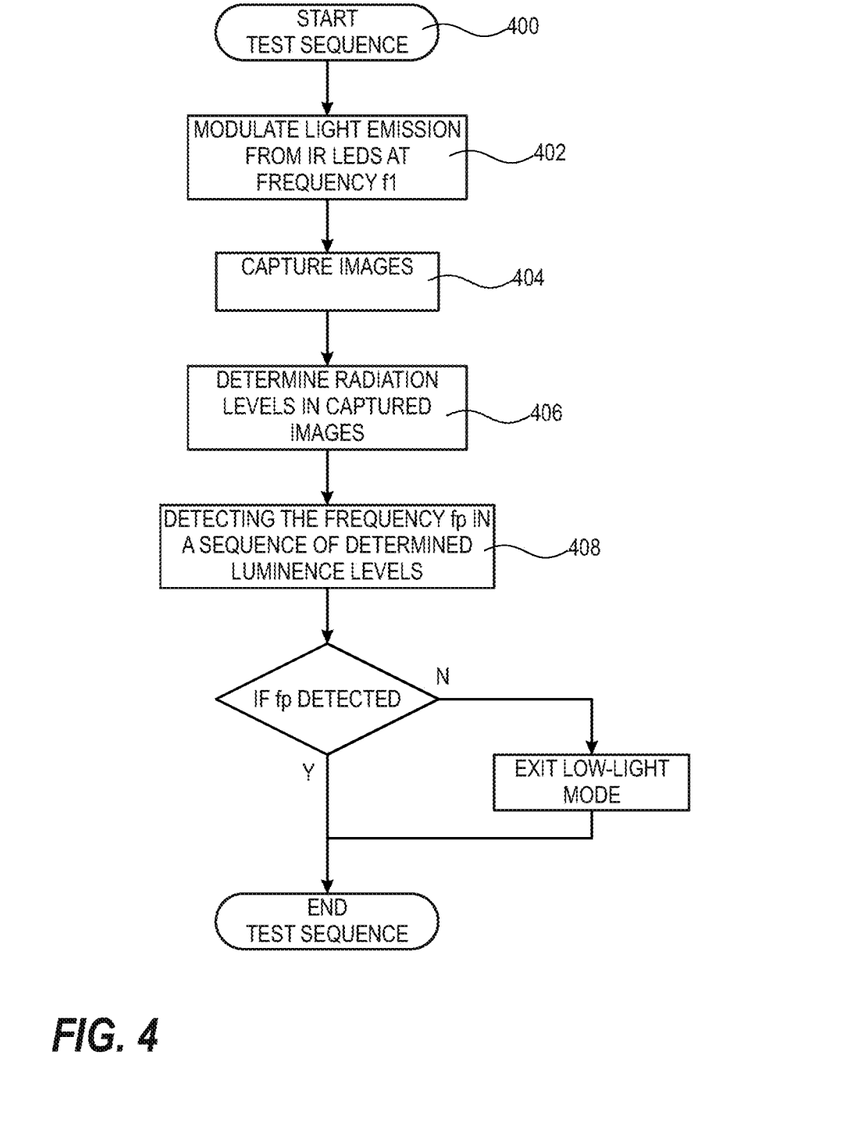
FIG. 4 is a flowchart of a method for controlling an infrared illumination source, including a test sequence, according to embodiments of the disclosure.

According to embodiments a method, see FIG. 4, for controlling an IR illumination source 14, e.g., IR LEDs, that is presently illuminating an area 12 captured by a camera 10 includes generation of a test sequence 400 intended to identify if the IR illumination is no longer needed. The test sequence 400 starts with the action of modulating the emission from the IR illumination source between a first emission intensity and a second emission intensity at a frequency f1 during a first predetermined time period, step 402. The camera continuously captures images of the area of the scene, step 404, and a plurality of images captured during the first predetermined time period are then used for determining a radiation level indicator for each one of the plurality of the captured images, step 406. When the radiation level indicators have been determined a sequence of these determined radiation level indicators is evaluated to determine whether a predicted frequency fp is detected or not in the sequence of radiation level indicators, step 408. The frequency fp is representing frequency f1 either as the frequency f1 or as a frequency alias due to aliasing and may be seen as a sampled frequency predicted from the frequency of the test sequence in view of the image rate of the camera 10. This is discussed in more detail below. If the evaluation results in the frequency fp being determined as not detected in the sequence of radiation level indicators, the IR illumination source 14 is stopped from lighting the scene at the area captured by the camera, i.e., exiting night mode, step 410. Further, in some embodiments, this evaluation failing to detect the frequency fp in the sequence of radiation level indicators indicates to the camera that the infrared-cut filter is to be reinserted in the optical path. However, if the evaluation results in the frequency fp being detected in the sequence of radiation level indicators, then the camera should remain in night mode and continue to illuminate the scene with the IR illumination source 14.

The general idea behind this test sequence is that if the variation in the modulated IR emissions is not possible to distinguish from noise, the lighting of the scene by ambient light is high enough, i.e. the addition of the radiation from the IR illumination source 14 is not necessary anymore.

Figure 5:
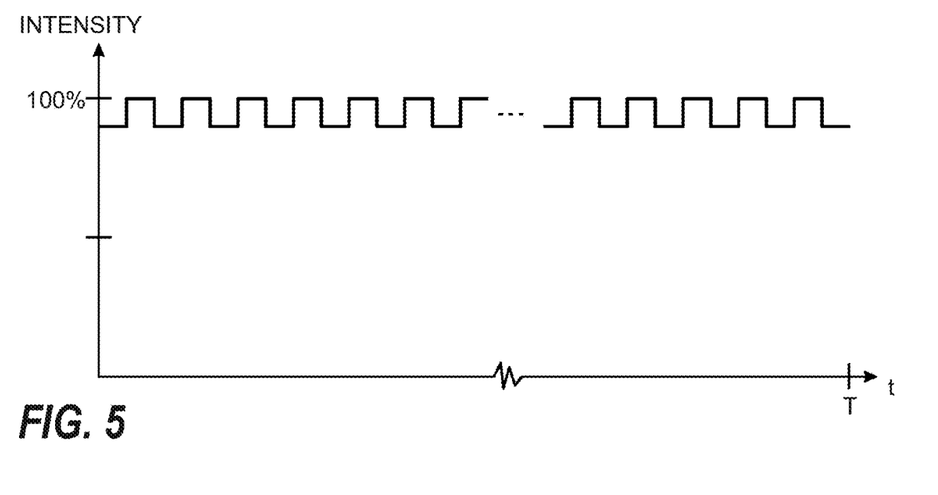
FIG. 5 is a schematic diagram showing a graph representing a modulation of emission from the IR illumination source, according to embodiments of the disclosure.

As an example, the modulation of the emission intensity may look like the graph in FIG. 5, in which the emission intensity is varied between a first and a second emission intensity, i.e. 100% and 90% of a high emission intensity during a predetermined time period T and at a frequency f1. The high emission intensity may in some embodiments be referred to as the operational emission intensity, i.e., the emission intensity appropriate for lighting the present scene. However, in some embodiments the high emission intensity, related to as 100%, is higher than the operational intensity. The lower level of the emission intensity may be of another value than 90%, e.g., the value may for example be any value between 50%-95%, between 60%-90%, between 75%-90%. Alternatively, the modulation starts with the lower emission intensity of the two, i.e. this may be seen as the first emission intensity is the low emission intensity and the second emission intensity is the high emission intensity. The emission intensity from the IR illumination source 14 may be determined by the capacity of the IR illumination source 14, the environment where the IR illumination source 14 is set up and/or preferences of the users. Further, the amplitude of the modulation, i.e. the difference between the high value and the low value, may be determined by testing. The testing may be carried out when the camera is installed at the location of operation, at a time when the camera system is in night mode and soon about to switch to day mode, with the aim to ensure that there is sufficient detectable signal until the actual switch of mode will take place. The testing of the camera may be carried out as a self-test procedure, for instance during a number of nights in a row. Different high and low values are tested and compared with the light level in day mode, with the IR filter inserted. At the time when the camera detects sufficient light in day mode, the high and low values may be set accordingly. The test procedure may be carried out during an installation or configuration phase, or the self-test procedure may be designed to limit the disturbance to the capturing of images enabling it to be carried out at any time. As another example, the testing may be carried out during production.

The time period during which the IR illumination source 14 is modulated may be 2 s-30 s, in some embodiments the time period is set to 10 s-20 s. The determining of whether the frequency f1 is detectable in the sequence of determined radiation levels may include increased resolution with longer time periods and thereby more data points. However, the modulation may be noticeable by the human eye and thereby a person watching a surveillance monitor presenting the imagery of the scene. Such noticeable variation may be disturbing to the person watching the monitor if being modulated for a longer time period. Hence, in determining the time period T for how long the IR illumination source 14 is modulated, the risk of prolonged modulation being an annoyance and thereby possibly a hazard in the surveillance operation must be considered.

The frequency f1 of the modulation is in some embodiments related to the image capturing frequency, i.e., frame rate, fr, measured in frames per second, fps, and should at most be half the frequency in relation to the camera's frames frame rate, fr, in order to make it possible for the image sensor of the camera to directly detect the frequency. Accordingly, if $f1 \leq fr/2$ the frequency of the modulated signal is possible to directly identify, according to the Nyquist-Shannon sampling theorem.

In alternative embodiments the modulation frequency f1 is set to a frequency higher than half the frame rate of the camera, i.e. $f1 > fr/2$, which, due to aliasing effects, will result in captured light variation frequency low enough to be captured by the camera. Hence, by utilising the aliasing effect even a high frequency f1 may be identified by the frequency resulting from the aliasing effect. For example, if the frequency, f1, of the modulated emission from the IR illumination source 14 is 70 Hz and the frame rate of the camera is 60 fp. Then, due to the aliasing effect, the frequency representing f1 in the captured images to look for is 10 Hz.

The frequency to look for in the sequence of radiation level indicators is, thus, the predicted frequency fp. The predicted frequency corresponds to f1 if $f1 \leq fr/2$ or to the frequency resulting from the aliasing effect if $f1 > fr/2$. Hence in order to facilitate the description of the disclosure predicted frequency fp is representing any one of the modulation frequency f1 or the corresponding frequency resulting from aliasing depending on the relation between the modulation frequency and the frame rate of the camera.

The evaluation of the sequence of determined radiation level indicators to determine if the frequency fp, or the frequency resulting from the aliasing effect, of the modulated emission from the IR illumination source is detectable includes, according to some embodiments, applying a transform to the sequence of determined radiation levels transforming the sequence of radiation level indicators to the frequency domain. Hence, the evaluation of the sequence of determined radiation level includes an evaluation in the frequency domain. Some examples of transforms that may be used are Fourier transforms, LaPlace transforms, cosine transforms, sine transforms, etc. In some embodiments discrete transforms may be used, e.g., Discrete Fourier transform, Discrete cosine transform, Discrete sine transform, Fast Fourier transform (FFT). The sequence of determined radiation level indicators for evaluation may, in some embodiments, include radiation level indicators from all image frames captured during the period of modulated IR radiation being emitted towards the scene. In some embodiments the sequence of determined radiation level indicators for evaluation may be determined for a subset of image frames captured during the period of modulated IR radiation is emitted towards the scene and in other embodiments the sequence of determined radiation level indicators for evaluation may be determined for image frames captured during a period when no modulated IR radiation is emitted towards the scene in addition to image frames captured during the period of modulated IR radiation is emitted towards the scene.

Figure 6:
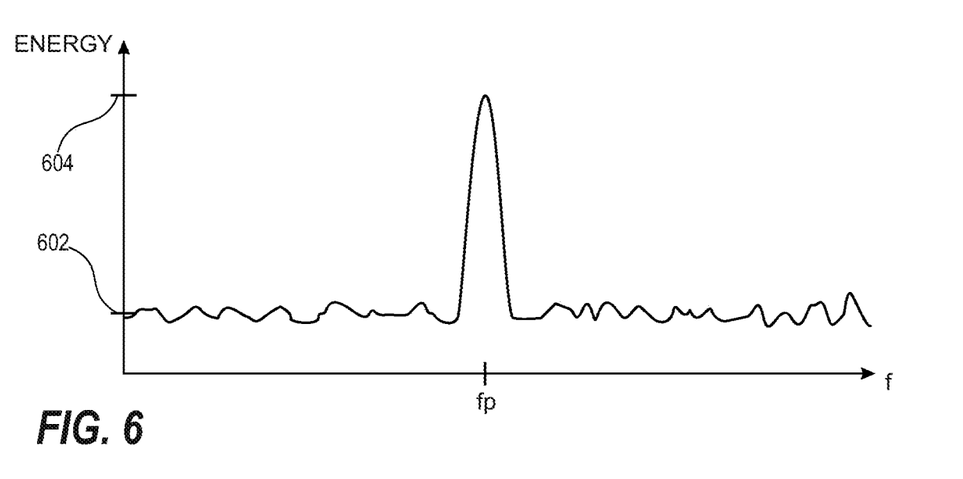
FIG. 6 is a schematic diagram showing a graph representing the result from a transformed sequence of radiation level indicators, according to embodiments of the disclosure.

The sequence of radiation level indicators transformed to the frequency domain using a transform as discussed above may result in data corresponding to the graph presented in FIG. 6. The graph depicts a situation where the energy level 604 of the radiation level indicators at the frequency about fp is larger than at any other frequency. As explained previously the frequency fp may be the frequency f1 of the modulated IR radiation or the resulting frequency alias. The lower level 602 of energy at the other frequencies may be considered a noise level representing the rest of the frequencies registered in the process of capturing image data during the time period of modulation of the emission intensity. In some embodiments the evaluation of whether the frequency fp is detected or not is implemented by calculating the energy level at frequency fp, or at a range including fp, calculating a noise level, and comparing the frequency fp energy level with the noise energy level. If the ratio between the energy level of the noise and the energy level at frequency fp is less than a detection threshold value, then the frequency fp modulation of the emission from the IR illumination source is deemed to be not detected. Alternatively, if the difference in energy level between the frequency fp and the noise is less than a detection threshold value, then the frequency fp modulation of the emission from the IR illumination source is deemed to be not detected. On the other hand, if the above ratio between energy levels or difference in energy levels is equal or greater than a detection threshold value, then the frequency fp modulation of the emission from the IR illumination source is deemed to be detected.

In some embodiments the transformation, e.g. FFT, of the sequence of determined radiation levels indicators results in a sequence of values each representing a signal energy related to discrete and adjacent frequency ranges. Each discrete frequency range is called a frequency bin. Then a first value, i.e. energy value, representing the energy level of the frequency bin including the frequency fp is compared to a second value representing the energy level of a bin including background noise signal energy. The second value may be acquired by selecting one of the frequency bins not representing the frequency fp or it may be acquired by calculating an average value or a median value for the frequency bins not representing the frequency fp. If the difference between the first value and the second value is equal to or larger than a threshold value, the frequency f1 modulation of the emission from the IR illumination source is deemed to be detected. If the difference between the first value and the second value is less than a threshold value, the frequency f1 modulation of the emission from the IR illumination source is deemed to be not detected.

In some embodiments the energy level at frequency fp, in the frequency range including frequency fp, or of the bin including frequency fp, is compared with a threshold value. This threshold value may be predetermined, e.g., during set up of the system, or it may be adaptive and based on measured or estimated noise in the frequency domain.

According to some embodiments a test sequence as described in connection with FIG. 4 is initiated based on the time of day, e.g., a time of day when there is a chance for the lighting conditions being favourable for capturing images of the scene without illuminating the scene with the IR illumination source 14 or some time before such a time. A time of day like this, when the light conditions is appropriate for turning off the IR illumination source, may vary during different seasons of the year, as the sunrise time will differ throughout the year. Such a time of day may be calculated using a well-known sunrise equation or a look up table including precalculated time values. The use of any of these methods require access to the date and time at the location of the camera.

Then, if the test sequence does not indicate that the lighting conditions are good enough for turning the IR illumination source off, the IR illumination source 14 is still in active operation providing illuminating, e.g., in accordance with the night mode, for a delay time period before the test sequence is initiated again in order to evaluate if the lighting conditions have changed yet. The reason for the lighting conditions not being good enough for turning the IR illumination source off may for instance be that the point of time for the first test is set a bit earlier than the predicted point in time in order to have some margin of error. Another reason for the lighting conditions not being good enough for turning the IR illumination source 14 off may for instance be that the scene 12 is outdoors and it is a cloudy day, thus, hindering some of the sunlight from passing through the atmosphere. Yet another reason for the initial test sequence to indicate that the lighting condition is not good enough for turning the IR illumination source 14 of may be that the area 12 to be captured by the camera 10 is blocked from light at sunrise, e.g., buildings, trees, or other fixed obstacles may be blocking the sun. The light may also be blocked by temporary obstacles, e.g., a truck parked at a position blocking the light from reaching the scene 12. The delay time period may be a couple of minutes to half an hour depending on how the system administrator want to set it up.

The Control of the IR illumination source 14 and/or the infrared-cut filter 26 may be controlled implementing a more complex scheme than the one described above. However, the test sequence described above may be included as part of such more complex scheme.

Figure 7:
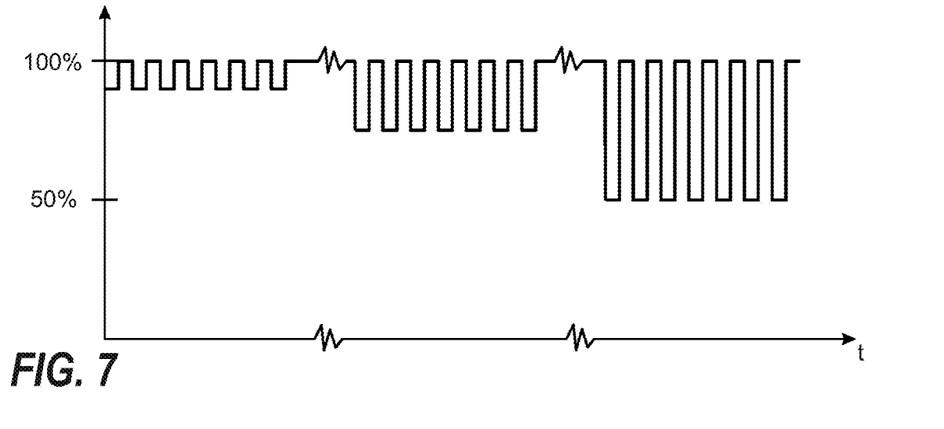
FIG. 7 is a schematic diagram showing a graph representing an alternative scheme for modulation of emission from the IR illumination source, according to embodiments of the disclosure.
Figure 8:
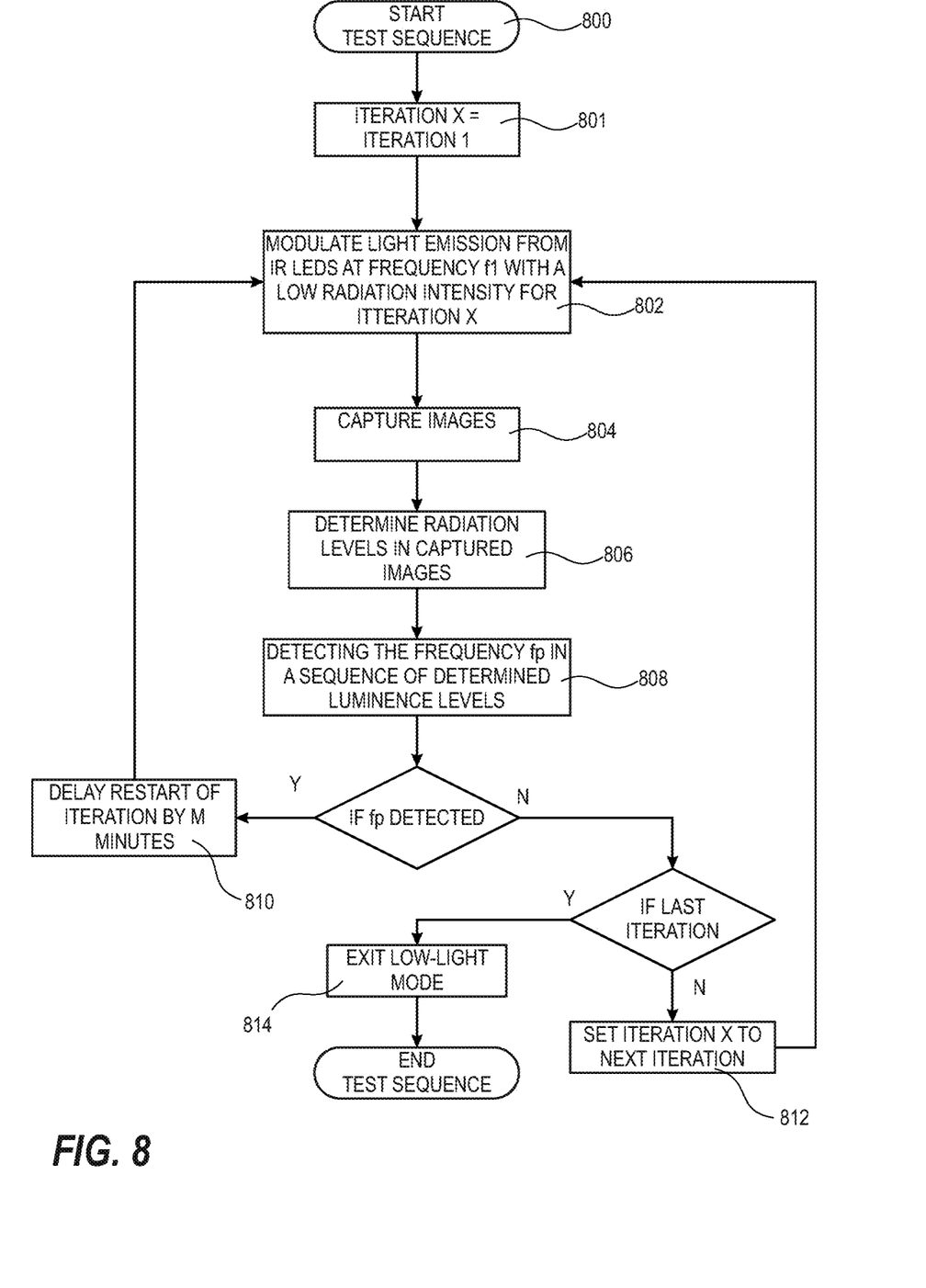
FIG. 8 is a flowchart of a method for controlling an infrared illumination source, including a plurality of test sequences, according to embodiments of the disclosure.

Now referring to the modulation scheme depicted in FIG. 7 and the flowchart in FIG. 8. In some embodiments of a more complex schemes, 800, an initial test sequence, setting an iteration counter, iteration X, to a first iteration, step 801, may be started as described above, steps 802-808 are corresponding steps to the steps 402-408 described in relation to FIG. 4, using a modulation with small variation in radiation intensity, e.g., the IR illumination source 14 may be modulated between normal intensity and an lower intensity, step 802, that does not easily noticed by a person watching the video, e.g., between 100% and 95-90% intensity. If the ambient light is low, i.e., it is dark, then even this modulation using low intensity difference will be detected without disturbing a person watching a monitor presenting the video stream from the camera. If the frequency f1 of the modulation is detected, i.e. the predicted frequency fp is detected, step 808, then the ambient light is not strong enough for considering the presently run iteration finished and therefore the process delays for M minutes, step 810, before the process start a new modulation sequence at the same iteration settings as the previous iteration, i.e., returning to step 802 with no increase or decrease of the iteration counter iteration X. If the predicted frequency fp, representing frequency f1 of the modulation, is not detected, the iteration number is checked by checking the iteration counter iteration X. If it is determined, in this check, that the iteration is not the last iteration the process set up the test sequence for the next iteration, step 812, using new and lower radiation intensity as the lower intensity in the modulation. However, if the test sequence was the last one night mode is exited, step 814, i.e., the IR illumination source is turned off and the infrared-cut filter 26 is inserted in the optical path. The number of iterations, i.e. the value that the iteration X represents in the last iteration, may be set to any value. The higher number of iterations the more subtle the increase in amplitude of the modulation.

In some embodiments of the above iterative testing, a modulated initial test sequence at a low amplitude, i.e. little difference between the high emission intensity and the low emission intensity is small, is emitted from the IR illumination source 14 continuously during low light conditions in order to detect when the lighting conditions are improving. Such, test sequence may alternatively be emitted at discrete and repeated time intervals.

The small variation in radiation intensity in the modulation may be selected at such a level that a non-detection of the modulation frequency f1, alternatively the frequency alias of f1, in the transformed sequence of radiation level indicators does not have to imply that the ambient light is good enough for turning off the IR illumination source 14 and remove the infrared-cut filter 26, but rather that it is time for another test sequence having larger difference between the normal intensity and the lower intensity of the modulated radiation intensity, e.g., between 100% and 90-75%. The next test sequence having even larger modulation amplitude, i.e., the difference between the normal radiation intensity and the lower radiation intensity of the modulated radiation, may be started in response to the frequency representing the modulation frequency not being detected in the transformed sequence of radiation level indicators. The number of iterations, including an increase of the difference between the high intensity and the low intensity of the modulated radiation intensity, may be at least two, in some embodiments three. The number of iterations may be even more. The advantage of additional iterations may be in environments where the difference between the high and low radiation intensities may be a problem. By making the difference grow by smaller increments the disturbance from the variation may be lessened and even avoided.

If the modulation frequency f1 or the frequency representing f1 due to aliasing is detected in one of the iterations, the modulation scheme may be paused for a predetermined time period, e.g., 5-10 minutes. Then, after the pause, the iteration may be started at the iteration presenting the radiation intensity difference for which the modulation frequency where detected. The advantage of start at this radiation intensity difference is that time may be saved in that the already passed iterations will not have to be repeated.

The iterations may have the following difference between high and low radiation intensities, wherein the high radiation intensity is 100%:

|  | Lower radiation intensity |
| --- | --- |
| Iteration 1 | 90-95% |
| Iteration 2 | 75-90% |
| Iteration 3 | 50-85% |

In systems of networked cameras, the device controlling the IR illumination source 14, e.g., the camera 10, may be configured to send a message stating that a modulation sequence has been started for the scene. The message may be broadcasted, addressed to specific cameras, or addressed to a central server managing the cameras of a camera installation. By informing other cameras that the modulation sequence has been started it is possible to have other cameras disregard the modulated emissions, and thereby avoid that these cameras react to test sequences not intended for them.

In some embodiments the modulation frequency is changed between test sequences. Accordingly, a first test sequence may be modulated at frequency f1, and the next test sequence at frequency f2, etc. Such a system may be set up to require two consecutive tests indicate that the lighting conditions is good enough to have the camera operate in day mode. The advantage of this is that the system will not be tricked or make a false decision based on unrelated light sources emitting light at the frequency used in a single frequency test sequence. This advantage may also be achieved by having the camera analyse image sequences when no test sequence is present and detecting possible interfering frequencies. In such implementation detected interfering frequencies may be used to have the IR illumination source 14 avoid sending a test sequence at such frequencies. The analysis of the image sequences not including the intentionally modulated IR emissions may be performed in the same way as during the test sequences.

The various embodiments described above are provided by way of illustration only and should not be construed to limit the disclosure. For example, the principles herein may be applied to any scene lighting system or camera system. Those skilled in the art will readily recognize various modifications and changes that may be made to the present disclosure without following the example embodiments and applications illustrated and described herein, and without departing from the scope of the present disclosure.

The invention claimed is:

1. A method for controlling at least one infrared (IR) illumination source, illuminating an area captured by a camera, the method comprising: modulating emission from the IR illumination source between a first emission intensity and a second emission intensity at a first frequency during a first predetermined time period, capturing images using an image sensor of the camera during the first predetermined time period, determining a radiation level indicator for each one of a plurality of the images captured by the image sensor, evaluating a sequence of determined radiation level indicators to determine whether a frequency resulting from the modulated emission at the first frequency is detected or not in the sequence of radiation level indicators, if the evaluation determines that the frequency resulting from the modulated emission at the first frequency is not detected in the sequence of radiation level indicators, the IR illumination source is stopped from lighting the area captured by the camera.

2. The method according to claim 1, wherein the evaluating of the sequence of radiation level indicators includes applying a transform to the sequence of radiation level indicators transforming the sequence of radiation level indicators to a frequency domain.

3. The method according to claim 2, wherein the determining of detection or no detection includes determining no detection of the frequency resulting from the modulated emission at the first frequency if the transformed sequence of radiation level indicators results in a value at the frequency resulting from the modulated emission at the first frequency that is less than a threshold value.

4. The method according to claim 1, wherein the second emission intensity is 50-95 percent of the first emission intensity of the IR illumination source.

5. The method according to claim 1, wherein the first predetermined time period during which the IR illumination source is modulated is a second to 10 minutes.

6. The method according to claim 1, wherein the determining of the radiation level indicator of a captured image includes determining an upper quartile luminance value of an area of the captured image.

7. The method according to claim 1, further comprising generating a signal instructing the camera to insert an IR-filter in an optical path leading to an image sensor of the camera if the evaluation results in the frequency resulting from the modulated emission at the first frequency being determined as not detected in the sequence of radiation level indicators.

8. The method according to claim 1, further comprising operating the IR illumination source in a normal mode for a delay time period, if the evaluation results in the frequency being determined as detected in the sequence of radiation level indicators, the normal mode being that the IR illumination source is operated as it was operated before the first time period during which the IR illumination source was modulated, before the process is repeated.

9. The method according to claim 1, further including an initial step comprising: modulating emission from the IR illumination source between a first initial emission intensity and a second initial emission intensity at a second frequency during a second predetermined time period, capturing images using the camera during the second predetermined time period, determining a radiation level indicator of each one of a plurality of the captured images, creating an initial sequence of radiation level indicators including determined radiation level indicators from the plurality of the captured images, evaluating the initial sequence of radiation level indicators to determine whether a frequency resulting from the modulated emission at the second frequency is detected or not in the initial sequence of radiation level indicators, if the evaluation results in the frequency resulting from the modulated emission at the second frequency being determined as not detected in the sequence of radiation level indicators, a next step in the at least two-step process is initiated.

10. The method according to claim 9, wherein the first frequency and the second frequency are the same frequency.

11. The method according to claim 9, wherein the control method is a two-step process and the next step in the at least two-step process is the final step.

12. The method according to claim 1, further including evaluating captured images from the camera for motion in the area captured by the camera and initiating the modulation of the emission from the IR illumination source when the motion evaluation indicates a motion value that is lower than a motion threshold.

13. The method according to claim 1, wherein the evaluating of the sequence of determined radiation level indicators to determine whether the frequency resulting from the modulated emission at the first frequency is detected or not in the sequence of radiation level indicators further includes determining if the first frequency or if a frequency resulting from aliasing of the first frequency and a frame rate of the captured images is detected or not in the sequence of radiation level indicators.

14. A video capturing system configured to carry out a method for controlling at least one infrared (IR) illumination source, illuminating an area captured by a camera, the method comprising:
modulating emission from the IR illumination source between a first emission intensity and a second emission intensity at a first frequency during a first predetermined time period,
capturing images using an image sensor of the camera during the first predetermined time period,
determining a radiation level indicator for each one of a plurality of the images captured by the image sensor,
evaluating a sequence of determined radiation level indicators to determine whether a frequency resulting from the modulated emission at the first frequency is detected or not in the sequence of radiation level indicators,
if the evaluation determines that the frequency resulting from the modulated emission at the first frequency is not detected in the sequence of radiation level indicators, the IR illumination source is stopped from lighting the area captured by the camera.

15. A non-volatile computer-readable medium comprising instructions which, when executed by a computer, cause the computer to carry out a method for controlling at least one infrared (IR) illumination source, illuminating an area captured by a camera, the method comprising: modulating emission from the IR illumination source between a first emission intensity and a second emission intensity at a first frequency during a first predetermined time period, capturing images using an image sensor of the camera during the first predetermined time period, determining a radiation level indicator for each one of a plurality of the images captured by the image sensor, evaluating a sequence of determined radiation level indicators to determine whether a frequency resulting from the modulated emission at the first frequency is detected or not in the sequence of radiation level indicators, if the evaluation determines that the frequency resulting from the modulated emission at the first frequency is not detected in the sequence of radiation level indicators, the IR illumination source is stopped from lighting the area captured by the camera.

* * * * *